Aug. 3, 1943.  R. A. COBEL  2,326,009

GLASS PRISM

Filed Dec. 29, 1939

INVENTOR
Ray C. Cobel.
BY Corbett + Mahoney
ATTORNEYS

Patented Aug. 3, 1943

2,326,009

UNITED STATES PATENT OFFICE 2,326,009

GLASS PRISM

Ray C. Cobel, Newark, Ohio, assignor to A. H. Heisey & Company, Newark, Ohio, a corporation of Ohio Application December 29, 1939, Serial No. 311,612

1 Claim. (Cl. 41—10)

My invention relates to glass prisms. It has to do, more particularly, with that type of glass prisms commonly used as pendants on glass candelabras, glass chandeliers, etc.

Glass prisms of the type indicated have heretofore been made in two pieces, namely, an upper relatively small piece and a lower elongated piece. It has been necessary to drill holes in the upper and lower pieces and associate fastening means therewith to connect the two pieces together. Furthermore, it has been necessary to drill an additional hole in the upper piece in order to connect a suspending means therewith for suspending the entire prism unit from the bobêche of a candelabra or other suitable support. Thus, with prism units of this type it is necessary to drill at least three holes in the glass. This results in a considerable amount of breakage. In the past, it has also been the practice to handcut these prisms. Obviously this greatly increases the cost of the prisms.

One of the objects of my invention is to provide glass prisms of the type indicated which are made in a single piece.

Another object of my invention is to provide glass prisms of the type indicated having means associated therewith for suspending them from a suitable support, the suspending means and associated structure of the prism being of such a nature that it will not be necessary to drill holes in the prism.

Another object of my invention is to provide glass prisms which are molded into the proper form so that it will not be necessary to perform expensive cutting and shaping operations thereon.

The preferred embodiment of my invention is illustrated in the accompanying drawing wherein similar characters of reference designate corresponding parts and wherein.

Figure 1:
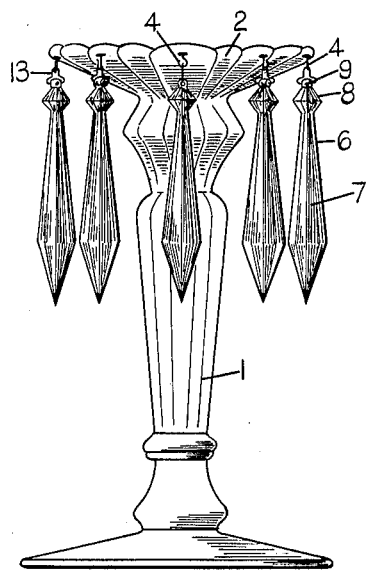
Figure 1 is a perspective view showing a glass candelabra having prisms made according to my invention suspended therefrom.

With reference to the drawing, I have illustrated a glass candelabra 1 having a bobêche 2 formed on the upper end thereof. The bobêche is provided with a plurality of circumferentially spaced apertures 3 which are large at their upper ends and gradually constrict towards their lower ends. Each of these openings has a hook member 4, formed of metal, extending therethrough. The upper portion 5 of the hook member is enlarged so that it will not pull downwardly through the opening. From each of the hooks 4, a prism unit 6, made according to my invention, is suspended.

Each of the units 6 embodies a lower prism portion 7 and an upper prism portion 8. In this instance, these portions are integral and differ from prior art prisms which are made in two parts. The portions 7 and 8 may be of any suitable form. As will be explained later, the entire unit is molded from glass in one piece.

Figure 2:
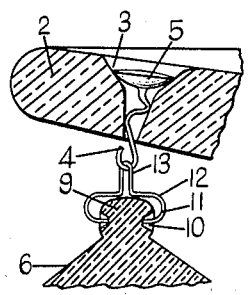
Figure 2 is a detail, mainly in vertical section, showing the suspending means for the prisms.

As shown in Figure 2 the upper end of the prism unit has a bulbous portion 9 formed thereon. At diametrically disposed points, this portion 9 is provided with small sockets 10 formed therein during the molding process. These sockets 10 extend a short distance into the glass and do not extend entirely therethrough, as shown. The sockets 10 are adapted to receive the opposed inwardly extending portions 11 of a spring wire clip 12. This clip 12 has an upper inverted U-shaped portion 13 which may be slipped over the hook 4. Thus, simple suspending means is provided for suspending the prism from the bobêche. The sockets 10 are formed in the molding process and to suspend the prism it is merely necessary to apply the clip 12. To do this it is merely necessary to spread the portions 11 and then allow them to spring into position in the sockets 10. It is not necessary to drill a hole in the prism with the consequent danger of breakage.

Figures 3, 4:
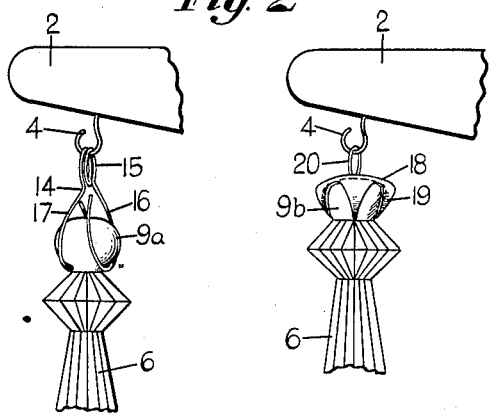
Figure 3 is a detail in side elevation showing different suspending means for the prisms.
Figure 4 is a similar view showing still another form of suspending means for the prisms.

In Figure 3 I illustrate a different type of prism suspending means. In this instance I provide a spring clip 14 made of a single piece of wire. This spring clip has an upper loop portion 15 that fits over the hook 4. It has two depending loop portions 16 and 17 which snap over the bulbous portion 9a formed on the upper end of the prism 6. To apply the clip 14 to the prism, it is merely necessary to pass the bulbous portion 9a between the portions 16 and 17, spreading them apart. They will then tend to approach each other and grip the portion 9a therebetween. This form also does not require holes to be drilled in the prism.

In Figure 4, I have illustrated still another form of suspending means which does not require the drilling of holes in the prism. This means comprises a metal member 18 which has ears 19 formed thereon that are bent around the bulbous portion 9b formed on the upper end of the prism. This member 18 has a loop 20 adapted to fit over the hook 4.

Thus it will be apparent that I have provided simple means for suspending the prism. These means are of such a nature that they may be applied easily to the prisms in such a manner that no breakage will result. In all instances, the prisms will be suspended in such a manner that they are free to have universal movement.

Figure 5:
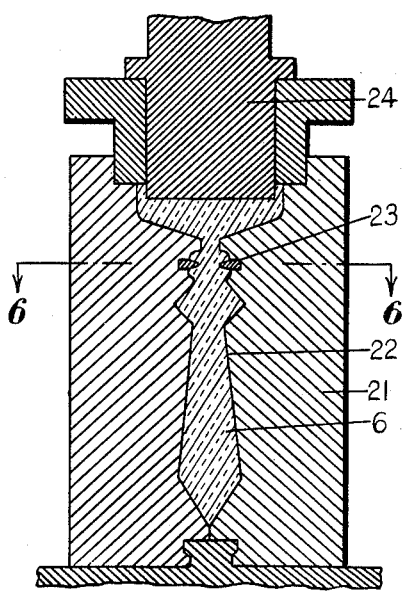
Figure 5 is a vertical sectional view taken through a molding unit showing how the prism is molded.
Figure 6:
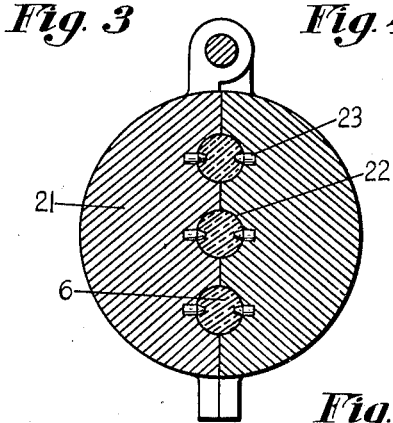
Figure 6 is a horizontal sectional view taken substantially along line 6—6 of Figure 5.

In Figures 5 and 6 I illustrate how the prism units of the type shown in Figure 2 may be molded. I provide a split mold 21 which has mold cavities 22. Each of these cavities has small pins 23 disposed therein at diametrically opposed points adjacent the upper end thereof. These pins will form the sockets 10. A plunger 24 is associated with each mold cavity for forcing the glass into all portions of the cavity to properly form the prism therein. After the prism is formed it is fire-polished to impart the proper luster thereto.

It will be apparent from the above description that I have provided prisms and suspending means having many advantages. Many of the advantages have been discussed therein. Others will be apparent.

Having thus described my invention, what I claim is:

In combination, a member having a plurality of one-piece glass prism units suspended therefrom, each of said prism units comprising a glass body portion having diametrically opposed sockets formed in the upper end thereof, means for suspending each of said prism units from said member, said means comprising a spring clip having opposed portions extending into said sockets and having an upper loop portion, said member having an opening formed therein, a hook member disposed in said opening and extending downwardly therethrough and having a hook on its lower end which engages said loop, said hook member having an enlarged portion on its upper end which prevents it from pulling downwardly through said opening.

RAY C. COBEL.